United States Patent
Kang et al.

(10) Patent No.: US 8,648,955 B2
(45) Date of Patent: Feb. 11, 2014

(54) APPARATUS AND METHOD FOR ACQUIRING LIGHT FIELD DATA USING VARIABLE MODULATOR

(75) Inventors: Joo-young Kang, Yongin-si (KR); Hyun-wook Ok, Seoul (KR); Seong-deok Lee, Suwon-si (KR); Byung-kwan Park, Seoul (KR); Jae-guyn Lim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 879 days.

(21) Appl. No.: 12/692,678

(22) Filed: Jan. 25, 2010

(65) Prior Publication Data

US 2010/0194926 A1   Aug. 5, 2010

(30) Foreign Application Priority Data

Jan. 30, 2009   (KR) .................. 10-2009-0007476

(51) Int. Cl.
*G02B 26/00* (2006.01)
*H04N 5/225* (2006.01)

(52) U.S. Cl.
USPC .......................................... 348/335; 359/237

(58) Field of Classification Search
USPC .......... 348/335, 340, 360; 359/237–240, 245, 359/290, 291
See application file for complete search history.

(56) References Cited

U.S. PATENT DOCUMENTS

| | | |
|---|---|---|
| 2004/0257454 A1 | 12/2004 | Pinto et al. |
| 2006/0157640 A1 | 7/2006 | Perlman et al. |
| 2006/0221209 A1 | 10/2006 | McGuire et al. |
| 2006/0239336 A1 | 10/2006 | Baraniuk et al. |
| 2007/0035623 A1 | 2/2007 | Garoutte et al. |
| 2007/0081200 A1 | 4/2007 | Zomet et al. |
| 2007/0252074 A1 | 11/2007 | Ng et al. |
| 2008/0062287 A1 | 3/2008 | Agrawal et al. |
| 2008/0187305 A1* | 8/2008 | Raskar et al. .................. 396/268 |
| 2009/0097092 A1* | 4/2009 | Luebke et al. ................. 359/237 |
| 2011/0128412 A1* | 6/2011 | Milnes et al. ............. 348/231.99 |
| 2012/0092494 A1* | 4/2012 | Garoutte et al. ............... 348/143 |

FOREIGN PATENT DOCUMENTS

| | | |
|---|---|---|
| CN | 1898697 A | 1/2007 |
| EP | 2 104 334 | 9/2009 |
| JP | 2006-319932 | 11/2006 |
| JP | 2008-191661 A | 8/2008 |
| JP | 2008-542863 A | 11/2008 |
| JP | 2008-310797 A | 12/2008 |
| KR | 10-2007-0057998 | 6/2007 |
| WO | WO 2006/125975 | 11/2006 |

OTHER PUBLICATIONS

European Search Report issued on Jul. 22, 2010, in corresponding European Application No. 10152304.1 (6 pages).

(Continued)

*Primary Examiner* — Timothy J Henn
(74) *Attorney, Agent, or Firm* — NSIP Law

(57) ABSTRACT

Disclosed are an apparatus and method for acquiring light field data using a variable modulator. The apparatus varies a modulator located between an optical system and a sensor adaptively according to objects to be captured or a peripheral environment. Accordingly, 4-dimensional (4D) light field data optimized according to objects to be captured or according to changes in focal distance may be acquired.

12 Claims, 10 Drawing Sheets

(56) References Cited

OTHER PUBLICATIONS

Ng, Ren, et al., "*Light Field Photograph with a Hand-Held Plenoptic Camera*," Stanford University Computer Science Tech Report CTSR 2005-02, Apr. 2005, pp. 1-11, Stanford University, California.

Chinese Office Action issued Jul. 2, 2013 in counterpart Chinese Application No. 201010000961.4 (19 pages, in Chinese, with complete English translation).

* cited by examiner

Lens(110)  Modulator  Move
           (120)
                    Sensor(130)

Lens(110)   Modulator (120)   Sensor(130)

APPARATUS AND METHOD FOR ACQUIRING LIGHT FIELD DATA USING VARIABLE MODULATOR

CROSS-REFERENCE TO RELATED APPLICATION

This application claims the benefit under 35 U.S.C. §119(a) of a Korean Patent Application No. 10-2009-0007476, filed on Jan. 30, 2009, the disclosure of which is incorporated herein by reference in its entirety for all purposes.

BACKGROUND

1. Field

The following description relates to processing an image, and more particularly, to an apparatus and method configured to acquire light field data using a variable modulator.

2. Description of the Related Art

Image data acquired through a lens and sensor positioned in a direction in which light travels may be referred to as "light field data," and image data acquired through a lens and sensor positioned in a different direction from the direction in which light travels may be referred to as "dark field data."

When light field data is acquired using an image capturing apparatus having a lens and sensor, generally, image capturing is performed using a single focal point. That is, a photograph is typically taken by either focusing on a nearby object, thereby making a distant object or background blurry, or by focusing on a distant object, thereby making a nearby object blurry.

Meanwhile, multi-view light field data, for example, 4-dimensional (4D) light field data may be acquired by providing a light modulator as a mask with a predetermined modulation pattern between a lens and a sensor. The acquired 4D light field data may be used to create a plurality of images with different focus points. That is, by processing the 4D light field data, a plurality of images with various focuses can be created. Accordingly, an image photographed unintentionally with a blurred focus may be restored. However, in a conventional image capturing apparatus with modulation characteristics or position of a light modulator fixed therein, 4D light field data may not be acquired adaptively to cope with changes in the properties of objects or in focal distance.

SUMMARY

According to one general aspect, there is provided an apparatus for acquiring multi-view light field data, including a modulator to modulate an image input to an optical system according to a modulation characteristic of the modulator, an image analyzer to analyze the image from the modulator, and a controller to move the modulator and/or adjust the modulation characteristic of the modulator according to the result of the analysis of the image analyzer.

Where a multi-view image is output from the image analyzer, the controller may increase the number of images included in the multi-view image by moving the modulator toward the optical system.

The controller may control the modulation characteristic of the modulator to have perfect transparency and non-transparency/non-perfect transparency sequentially.

The image analyzer may extract multi-view 4-dimensional (4D) light field data from the image output from the modulator.

The controller may control the modulation characteristic of the modulator to have transparency to acquire a 2-dimensional (2D) image.

According to another general aspect, there is provided a method of acquiring light field data in an image acquiring apparatus, the method including acquiring light field data corresponding to an image input to an optical system from a modulator of the image acquiring apparatus, analyzing the acquired light field data, adjusting a position and/or a modulation characteristic of the modulator according to the result of the analysis, and acquiring light field data of the image from the modulator whose position and/or modulation characteristic has been adjusted.

The adjusting of the position of the modulator may include, where a multi-view image is output in the analyzing of the acquired light field data, increasing the number of images included in the multi-view image by moving the modulator toward the optical system.

The adjusting of the modulation characteristic of the modulator may include controlling to the modulator to have perfect transparency and non-transparency/non-perfect transparency sequentially.

The adjusting of the modulation characteristic of the modulator may include controlling the modulator to have transparency to acquire a 2-dimensional (2D) image.

The adjusting of the position of the modulator may include one or more of moving the modulator and rotating or tilting the modulator.

According to still another general aspect, there is provided an image acquiring apparatus including a modulator to receive and modulate an image from an optical system, an image analyzer to analyze the image from the modulator, and a controller to adjust the modulator according to the result of the analysis of the image analyzer, the adjust including one or more of moving the modulator, adjusting a modulation characteristic of the modulator, and rotating or tilting the modulator.

The controller may adjust the modulator to adoptively acquire light field data.

The light field data may be a multi-view light field data and the controller may increase the number of images included in the multi-view light field data by moving the modulator toward the optical system.

The image analyzer may extract multi-view 4-dimensional (4D) light field data from the image from the modulator.

The controller may control the modulation characteristic of the modulator to have transparency to acquire a 2-dimensional (2D) image.

The controller may control the modulation characteristic of the modulator to transmit or block images sequentially so as to acquire an image of a moving object.

The controller may control the modulation characteristic of the modulator to vary a modulation pattern of the modulator so as to acquire view images of different size.

The apparatus may further include a sensor to detect the image from the modulator and convert the detected image into digital data, wherein the image analyzer analyzes the digital data corresponding to the image from the modulator with optics-related information of/from the optical system.

The apparatus may further include the optical system to receive an image of an object, a sensor to detect the image of the object from the modulator, the modulator being adjusted according to the controller, an image processor to process the image from the sensor, and a display unit to display the image from the image processor.

Other features and aspects will be apparent from the following description, the drawings, and the claims.

Figure 1:
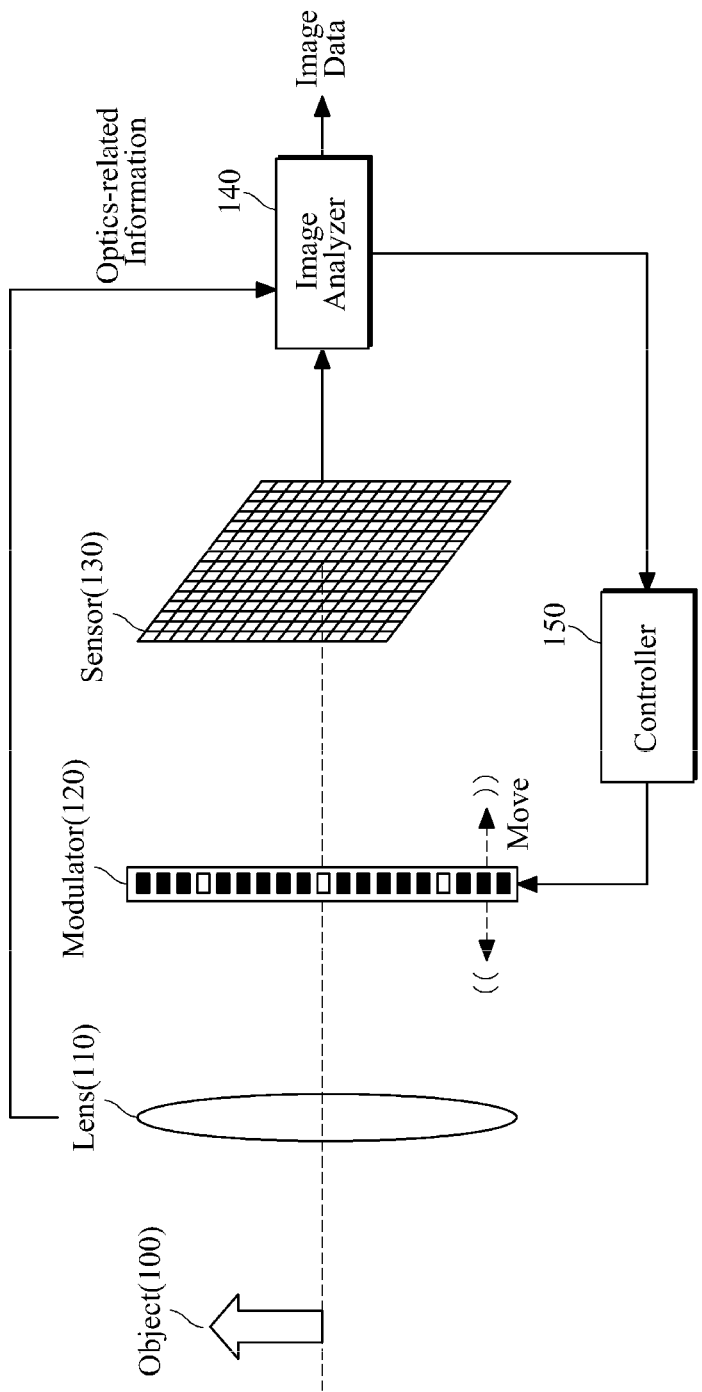
FIG. 1 is a diagram illustrating an example of an apparatus for acquiring multi-view light field data.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates an example of an apparatus for acquiring multi-view light field data.

Referring to FIG. 1, the light field data acquisition apparatus includes a lens 110, a modulator 120, a sensor 130, an image analyzer 140, and a controller 150.

An image of an object 100 that passes through an optical system, that is, an optical device such as the lens 110, is detected as light field data by the sensor 130 via the modulator 120. The modulator 120, for example, a kind of mask, adjusts the modulation pattern of the image that passes through the lens 110. As an illustration, the modulator 120 may have a mask is pattern shown in FIG. 2A. The Fourier-transformed result of an image that passes through the modulator 120, when the modulator 120 has the mask pattern shown in FIG. 2A, may appear as shown in FIG. 2B.

The sensor 130 detects the image of the object 100 passed through the modulator 120 and converts the detected image into digital data. The image analyzer 140 analyzes the image of the object 100 with reference to optics-related information obtained through the lens 110, and transfers the results of the analysis to the controller 150.

The controller 150 adjusts the position and/or modulation characteristics of the modulator 120 according to the results of the analysis by the image analyzer 140. For example, if the image of the object 100 analyzed by the image analyzer 140 is blurry or small, the controller 150 may adjust the position or modulation characteristics of the modulator 120 to compensate for the blur or small image. Image data corresponding to an image from the modulator 120 whose position and/or modulation characteristics has been changed may be output from the image analyzer 140 for utilization or further processing.

As an illustration, the controller 150 may control the modulation pattern of the modulator 120 to have transparency, for example, "perfect transparency" corresponding to the case of not performing the modulation, so as to produce a 2D image. As another illustration, the controller 150 may switch the modulation characteristics of the modulator 120 on/off over time in a manner so as to transmit or block images sequentially, through which an image of a moving object may be acquired. Further description of adjusting the modulation characteristics and position of the modulator 120 will be described with reference to FIGS. 3 through 10.

Figure 2A:
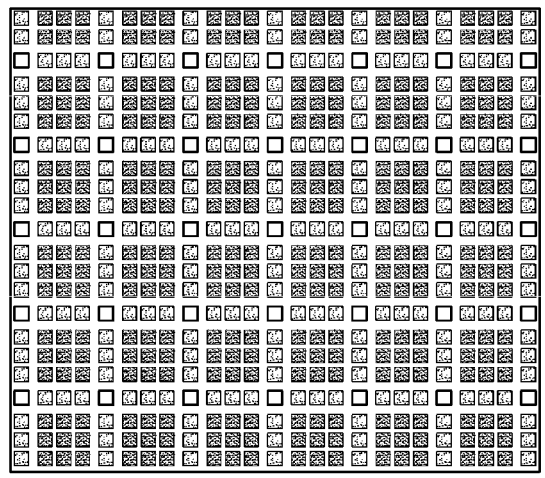
FIG. 2A shows an example of a mask pattern of a modulator included in the light field data acquisition apparatus of FIG. 1.
Figure 2B:
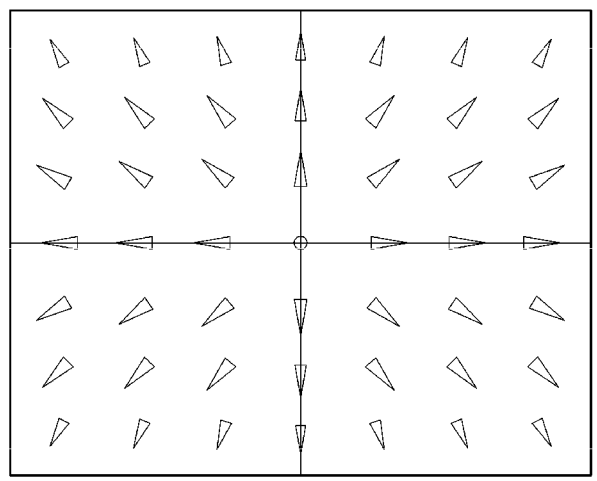
FIG. 2B shows a Fourier-transformed result of an image from the modulator of FIG. 2A.

FIGS. 2A and 2B show a mask pattern of the modulator 120 of FIG. 1, and a Fourier-transformed result of an image that passed through the modulator 120, respectively.

For example, if three signals with specific carrier frequencies as 1-dimensional carrier signals are used, a multi-view image with 7×7 views may be acquired and each view image may is have a resolution of 340×250.

Referring to FIGS. 2A and 2B, if a modulator in the form of a 2-dimensional mask is used, a plurality of view images having a constant resolution may be acquired. The number of views or resolution may depend on the position or modulation pattern of the modulator 120.

Figure 3:
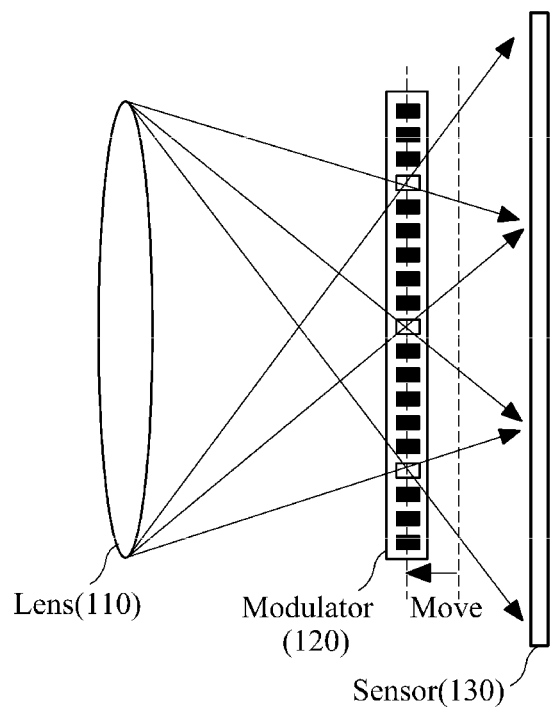
FIG. 3 is a diagram illustrating a configuration of the light field data acquisition apparatus of FIG. 1 when the modulator is moved.

FIG. 3 illustrates a configuration of the light field data acquisition apparatus of FIG. 1 when the modulator 120 is moved.

Figure 4A:
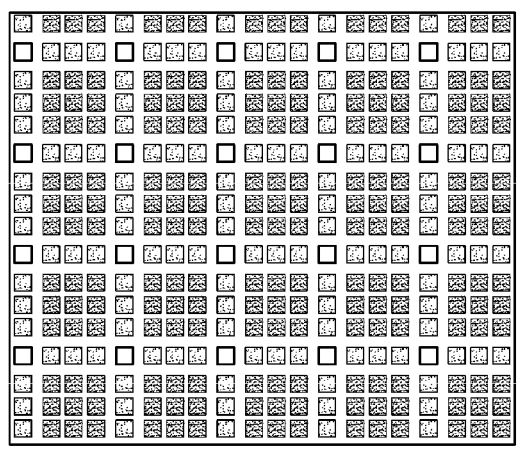
FIG. 4A shows another example of a mask pattern of the modulator of FIG. 1.

Referring to FIG. 3, the modulator 120 may move toward or away from the lens 110 under the control of the controller 150 (see FIG. 1). If the modulator 120 moves toward the lens 110, more views are acquired. For example, as illustrated in FIG. 3, if the modulator 120 moves toward the lens 110, each lattice of the modulation pattern of the modulator 120 is enlarged, which is illustrated in FIG. 4A. That is, due to the shortened distance between the lens and modulator 120, the modulator 120 may have a mask pattern whose lattices are enlarged as illustrated in FIG. 4A.

Figure 4B:
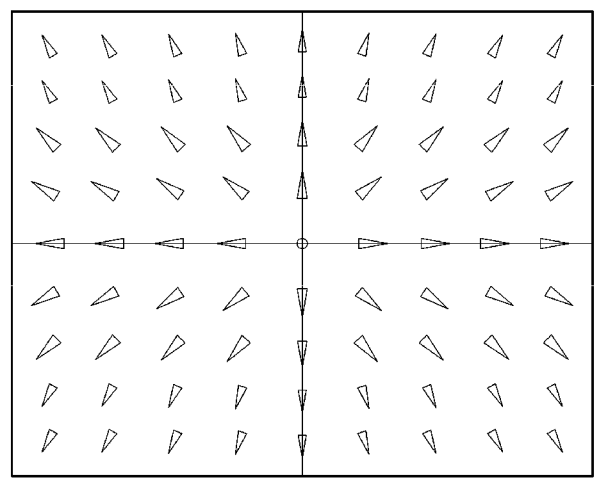
FIG. 4B shows a Fourier-transformed result of an image from the modulator of FIG. 4A.

FIGS. 4A and 4B show another mask pattern of the modulator 120 and a Fourier-transformed result of an image that passed through the modulator 120 having the mask pattern of FIG. 4A, respectively.

For example, if four signals with specific carrier frequencies as 1-dimensional carrier signals are used, a multi-view image with 9×9 views may be acquired and each view image may have a resolution of 240×180. With more carrier signals, a spatial resolution may be lower but more views may be obtained.

If the modulator 120 with the 2-dimensional mask moves toward the lens 110, the mask pattern illustrated in FIG. 2A is enlarged to the mask pattern illustrated in FIG. 4A, and accordingly a multi-view image as illustrated in FIG. 4B may be acquired.

According to the example(s) described above with reference to FIGS. 3, 4A and 4B, 4D light field data may be acquired adaptively to accommodate changes in the properties of objects is or in focal distance, for example, changes in focal distance in the case of zooming-in or zooming-out.

Figure 5:
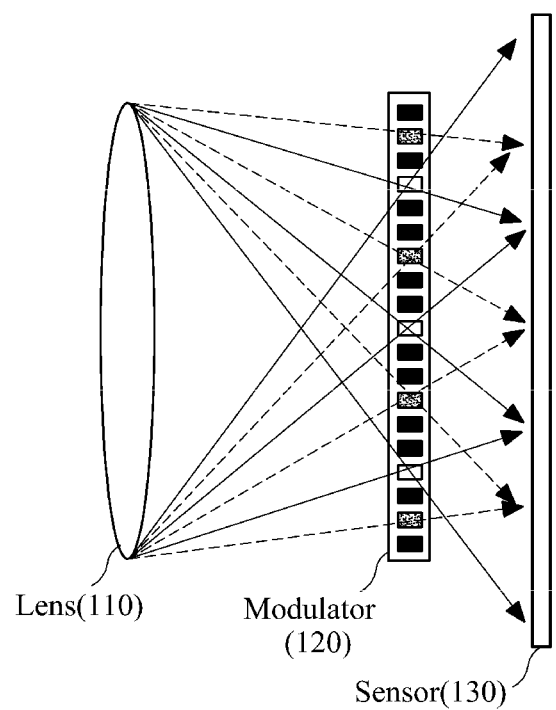
FIG. 5 is a diagram illustrating a configuration of the light field data acquisition apparatus of FIG. 1 when the mask pattern of the modulator is varied.

FIG. 5 illustrates a configuration of the light field data acquisition apparatus of FIG. 1 when the mask pattern of the modulator 120 is varied.

Referring to FIG. 5, if the mask pattern of the modulator 120 is varied, an image obtained through the sensor 130 also varies. The varied mask pattern and image will be described with reference to FIGS. 6A and 6B, below.

Figure 6A:
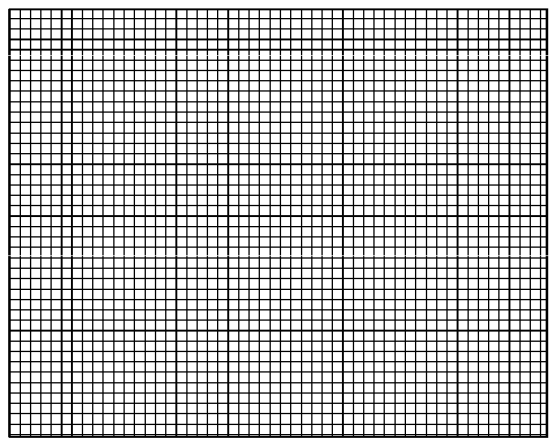
FIG. 6A shows an example of a varied mask pattern of the modulator of FIG. 1.
Figure 6B:
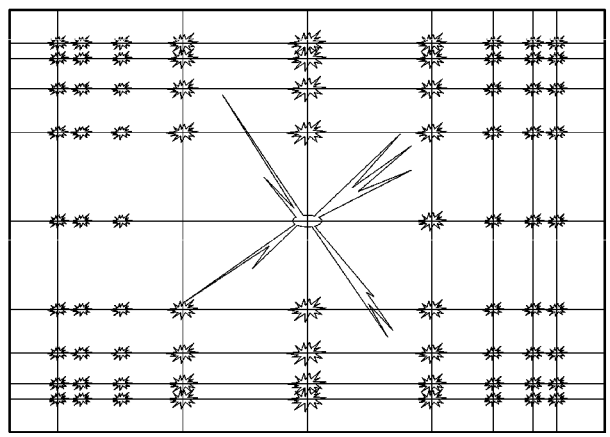
FIG. 6B shows a Fourier-transformed result of an image from the modulator of FIG. 6A.

FIGS. 6A and 6B show a mask pattern of the modulator 120 and a Fourier-transformed result of an image that passed through the modulator 120 having the mask pattern of FIG. 6A, respectively.

Compared to the example in which four 1-dimensional carrier signals with non-harmonic characteristics are used as carrier frequencies, a multi-view image with 9×9 views may be acquired. In this case, the number of views is the same as in the case of using signals with harmonic characteristics as carrier frequencies, but the view images may differ in size. In order to achieve the same effect as when using the 2-dimensional mask, a method of varying the modulation pattern of the modulator 120 may be used. If the modulation pattern of the two-dimensional mask is set as illustrated in FIG. 6A, larger view images are acquired in the center of the resultant multi-view image and smaller view images are acquired at the edges of the multi-view image as illustrated in FIG. 6B.

According to the example(s) described above with reference to FIGS. 5, 6A and 6B, images with desired views may be enlarged.

Referring again to FIG. 1, the mask pattern or modulation pattern of the modulator 120 may be varied according to a control signal of the controller 150. For example, the controller 150 may adjust the modulation characteristics of the modulator 120 according to a result of an analysis by the image analyzer 140, without moving or replacing the modulator 120.

Figure 7:
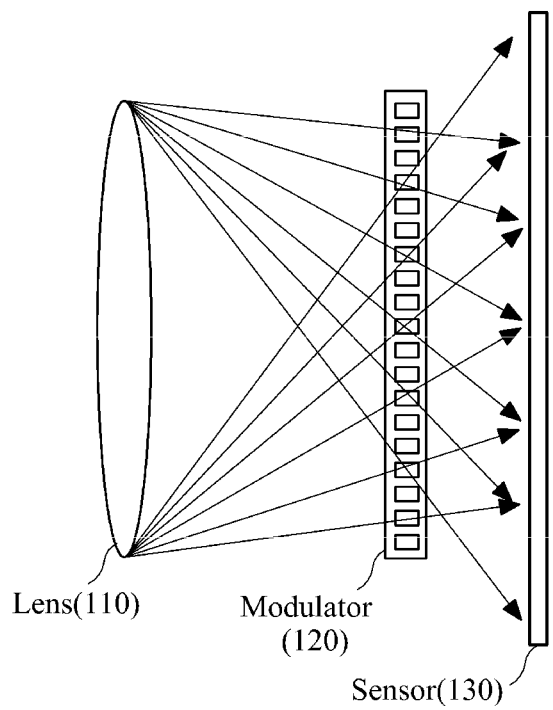
FIG. 7 is a diagram illustrating a configuration of the light field data acquisition apparatus of FIG. 1 when the mask pattern of the modulator has perfect transparency.

FIG. 7 illustrates a configuration of the light field data acquisition apparatus of FIG. 1 when the mask pattern of the modulator 120 has perfect transparency.

Referring to FIG. 7, if the controller 150 (see FIG. 1) controls the modulator 120 to have perfect transparency, 2-dimensional (2D) images instead of 4-dimensional (4D) light field data may be acquired. In other words, if the controller 150 controls the modulator 120 to pass an image of an object as is, a 2D image may be acquired.

Figure 8A:
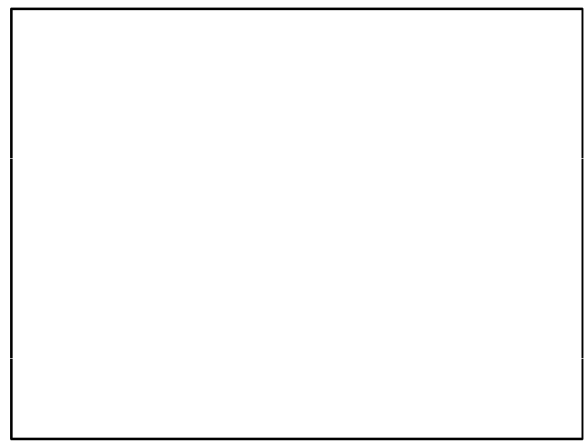
FIG. 8A shows a mask pattern of a modulator having perfect transparency.
Figure 8B:
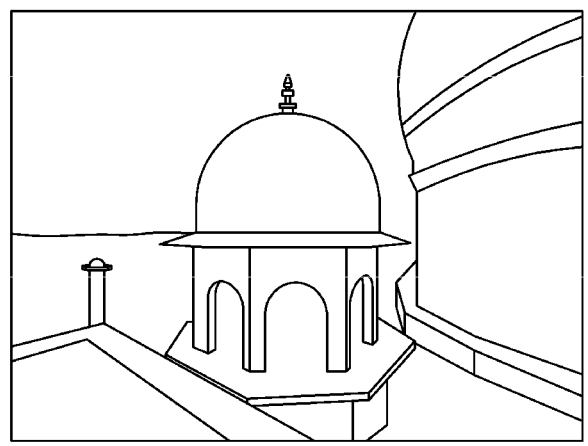
FIG. 8B shows an image from the modulator of FIG. 8A.

FIGS. 8A and 8B show a mask pattern of the modulator 120 having perfect transparency and an exemplary image that passed through the modulator 120 having the mask pattern of FIG. 8A, respectively.

That is, as illustrated in FIG. 8A, since the case where a mask pattern with perfect transparency is used is the same as the case where no modulator is provided, a 2D image illustrated in FIG. 8B may be acquired.

This example corresponds to the case where 2D images are acquired by varying only the pattern characteristics of the modulator 120 without varying the configuration of the 4D light field data acquisition apparatus.

Figure 9:
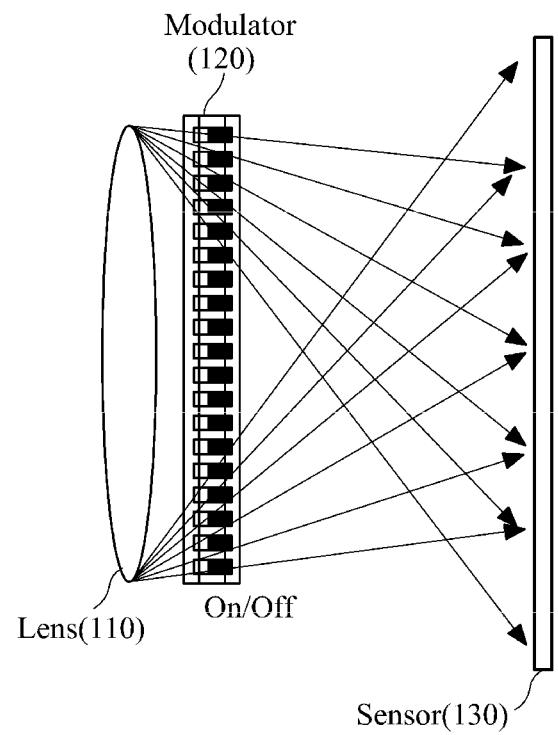
FIG. 9 is a diagram illustrating a configuration of the light field data acquisition apparatus of FIG. 1 when the mask pattern of the modulator is switched ON/OFF over time.

FIG. 9 illustrates a configuration of the light field data acquisition apparatus of FIG. 1 when the mask pattern of the modulator 120 is switched ON/OFF over time.

For example, referring to FIG. 9, by switching the transparency of the modulator 120 on/off sequentially over time, 4D light field data for a moving object may be acquired. The transparency of the modulator 120 may be set to perfect transparency and non-transparency/non-perfect transparency sequentially over time, and durations of the perfect transparency and non-transparency/non-perfect transparency may also be adjusted. In this case, the modulator 120 may be positioned close to the lens 110.

Figure 10A:
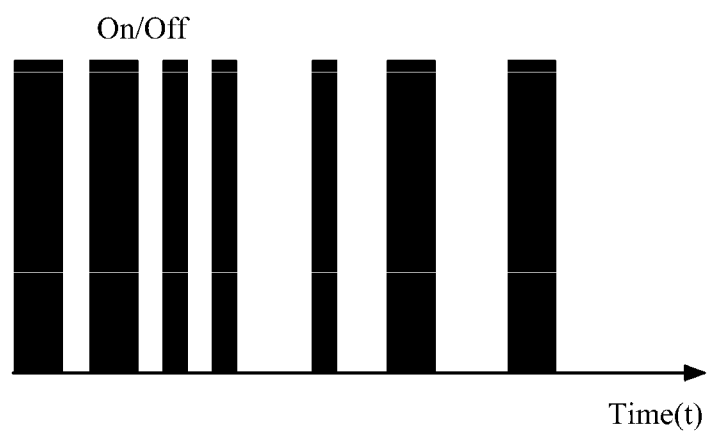
FIG. 10A illustrate a graph showing ON/OFF states of the mask pattern of the modulator corresponding to FIG. 9 when the mask pattern is switched ON/OFF over time.
Figure 10B:
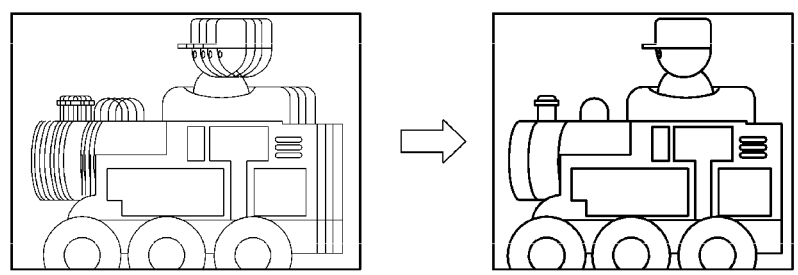
FIG. 10B shows an image pattern from the modulator corresponding to FIG. 10A.

FIG. 10A illustrate a graph showing ON/OFF states of the mask pattern of the modulator 120 when the mask pattern is switched ON/OFF over time, and FIG. 10B shows an image that passed through the modulator 120 in accordance to FIG. 10A.

That is, if the transparency of the modulator 120 is switched ON/OFF as shown in FIG. 10A, an image shown in the left part of FIG. 10B is acquired, and if the image is processed, a clear image of 4D light field data for a moving object may be acquired as shown in the right part of FIG. 10B.

This example corresponds to the case where a clear image is acquired, even for a moving object, by varying only the pattern characteristics of the modulator 120 without changing the configuration of the 4D light field data acquisition apparatus.

Figure 11:
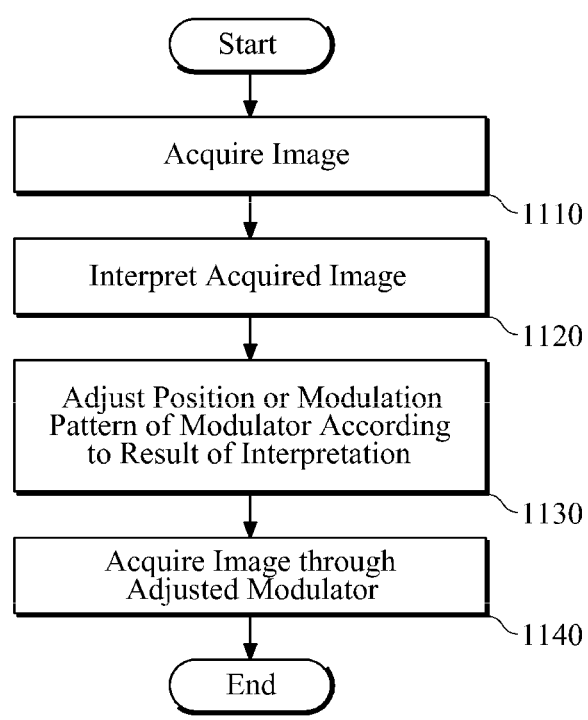
FIG. 11 is a flowchart of an image acquiring method according to one example.

FIG. 11 is a flowchart of an image acquiring method according to one example. The method may be performed by, for example, the apparatus described with reference to FIG. 1.

In operation 1110, light field data for an image input through an optical system such as a lens is acquired. The acquired light field data may be 4D light field data or 2D light field data.

In operation 1120, the acquired image is analyzed, and the position or modulation pattern of a modulator is adjusted according to the result of the analysis in operation 1130.

In operation 1140, light field data for the corresponding object is again acquired through the adjusted modulator.

Figure 12:
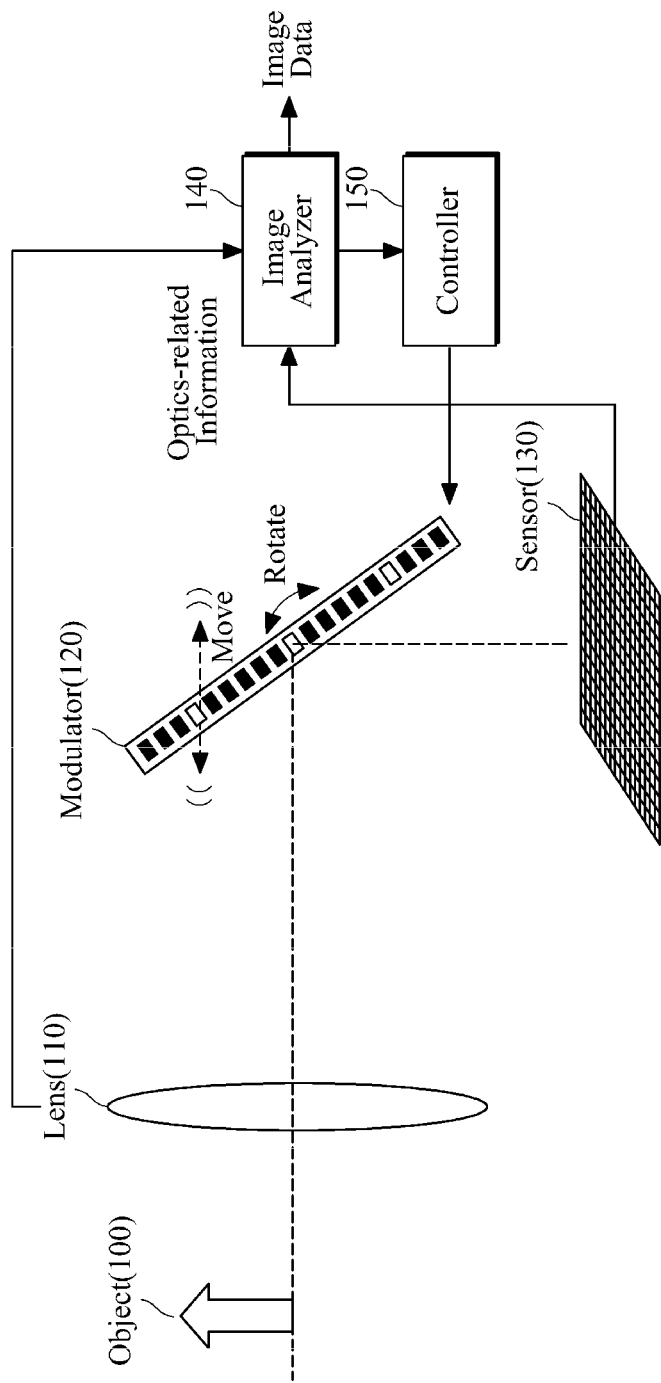
FIG. 12 is a diagram illustrating another example of an apparatus for acquiring multi-view light field data.

FIG. 12 illustrates a configuration of another exemplary apparatus for acquiring multi-view light field data.

Referring to FIG. 12, the light field data acquisition apparatus includes a lens 110, a modulator 120, a sensor 130, an image analyzer 140, and a controller 150.

In this implementation, the modulator 120 and the sensor 130 may be aligned as shown in FIG. 12, and the modulator 120 may be a reflective modulator which is movable and rotatable. Accordingly, the controller 150 controls the movement or rotation of the modulator 120 as well as the modulation characteristics of the modulator 120. Image data corresponding to an image from the modulator 120 whose position and/or modulation characteristics has been changed may be output from the image analyzer 140 for utilization or further processing. For example, an image processor (not shown) may process the image from the image analyzer 140 and the processed image may be displayed in a display unit (not shown). It is understood that the image processor may receive the image from the sensor 130 instead of the image analyzer 140. It is also understood that while described separately, the image processor and the image analyzer 140 may be combined as a single part or in a single chipset. In the case of using a reflective modulator, light efficiency may be improved.

Also, the image analyzer 140 may utilize optics-related information of/from an optical system of the apparatus to analyze the image from the modulator 120. For example, the optics-related information may include data of the lens 110, and for example, may be focal distance of the lens 110, aberration and optic angle.

According to example(s) described above, an image acquiring apparatus may adaptively acquire multi-view light field data by varying the modulation pattern and/or position of a modulator located between a lens and a sensor, according to objects to be photographed or a peripheral environment. For example, varying the modulation pattern may include adjusting the attenuation pattern.

According to example(s) described above, the position and/or characteristics of a modulator of an image acquiring apparatus may be varied to cope adaptively with changes in properties of objects or in focal distance. Accordingly, spatial resolution deterioration of, for example, 4D cameras may be prevented. In other words, 4D light field data may be acquired optimized according to objects to be captured or according to changes in focal distance. Also, by is varying the position and/or characteristics of the modulator, 2D image data as well as 4D light field data may be acquired.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

It is understood that the terminology used herein, for example, a modulator, may be different in other applications or when described by another person of ordinary skill in the art. For illustration purpose only, the term modulator may be described or known as a light modulator, a camera array, an image adjusting array, and a light dividing mask.

It is also understood, and for illustration purposes only, an exemplary apparatus for is acquiring light field data consistent with teachings herein may be applicable in cameras including a camera in mobile phones/devices, medical imaging equipments, microscopy imaging equipments including scientific microscopes, astronomical telescopes, and other image capturing systems.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for acquiring multi-view light field data, comprising:
    a modulator to modulate an image input to an optical system according to a modulation characteristic of the modulator;
    an image analyzer to analyze the image from the modulator; and
    a controller to move the modulator according to the result of the analysis of the image analyzer, wherein
    where a multi-view image is output from the image analyzer, the controller increases the number of images included in the multi-view image by moving the modulator toward the optical system.

2. An apparatus for acquiring multi-view light field data, comprising:
    a modulator to modulate an image input to an optical system according to a modulation characteristic of the modulator;
    an image analyzer to analyze the image from the modulator; and
    a controller to move the modulator according to the result of the analysis of the image analyzer, wherein
    the image analyzer extracts multi-view 4-dimensional (4D) light field data from the image output from the modulator.

3. A method of acquiring light field data in an image acquiring apparatus, the method comprising:
    acquiring light field data corresponding to an image input to an optical system from a modulator of the image acquiring apparatus;
    analyzing the acquired light field data;
    adjusting a position of the modulator according to the result of the analysis; and
    acquiring light field data of the image from the modulator whose position has been adjusted, wherein
    the adjusting of the position of the modulator comprises, where a multi-view image is output in the analyzing of the acquired light field data, increasing the number of images included in the multi-view image by moving the modulator toward the optical system.

4. An image acquiring apparatus comprising:
    a modulator to receive and modulate an image from an optical system;
    an image analyzer to analyze the image from the modulator; and
    a controller to adjust the modulator according to the result of the analysis of the image analyzer, the adjustment including one or more of moving the modulator, and rotating or tilting the modulator.

5. The apparatus of claim 4, wherein the controller adjusts the modulator to adoptively acquire light field data.

6. The apparatus of claim 5, wherein the light field data is multi-view light field data and the controller increases the number of images included in the multi-view light field data by moving the modulator toward the optical system.

7. The apparatus of claim 5, wherein the image analyzer extracts multi-view 4-dimensional (4D) light field data from the image from the modulator.

8. The apparatus of claim 4, wherein the controller controls the modulation characteristic of the modulator to have transparency to acquire a 2-dimensional (2D) image.

9. The apparatus of claim 4, wherein the controller controls the modulation characteristic of the modulator to transmit or block images sequentially so as to acquire an image of a moving object.

10. The apparatus of claim 4, wherein the controller controls the modulation characteristic of the modulator to vary a modulation pattern of the modulator so as to acquire view images of different size.

11. The apparatus of claim 4, further comprising a sensor to detect the image from the modulator and convert the detected image into digital data, wherein the image analyzer analyzes the digital data corresponding to the image from the modulator with optics-related information of/from the optical system.

12. The apparatus of claim 4, further comprising:
the optical system to receive an image of an object;
a sensor to detect the image of the object from the modulator, the modulator being adjusted according to the controller;
an image processor to process the image from the sensor; and
a display unit to display the image from the image processor.

\* \* \* \* \*